United States Patent [19]

Mishima et al.

[11] Patent Number: 5,296,704
[45] Date of Patent: Mar. 22, 1994

[54] SCANNING TUNNELING MICROSCOPE

[75] Inventors: Shuzo Mishima; Takao Okada; Tsugiko Takase; Hiroko Ota; Hirofumi Miyamoto, all of Hachioji, Japan

[73] Assignee: Olympus Optical Co., Ltd., Tokyo, Japan

[21] Appl. No.: 821,123

[22] Filed: Jan. 14, 1992

Related U.S. Application Data

[63] Continuation of Ser. No. 590,462, Sep. 28, 1990, abandoned.

[30] Foreign Application Priority Data

Oct. 2, 1989 [JP] Japan .................. 1-257523

[51] Int. Cl.$^5$ ............................... H01J 37/00
[52] U.S. Cl. .................... 250/306; 250/307
[58] Field of Search ........... 250/306, 307, 423 F, 250/442.1

[56] References Cited

U.S. PATENT DOCUMENTS

| | | | |
|---|---|---|---|
| 4,343,993 | 8/1982 | Binnig et al. | 250/306 |
| 4,762,996 | 8/1988 | Binning et al. | 250/306 |
| 4,841,148 | 6/1989 | Lyding | 250/306 |
| 4,914,293 | 4/1990 | Hayashi | 250/306 |
| 4,992,728 | 2/1991 | McCord et al. | 250/307 |
| 4,999,495 | 3/1991 | Miyata et al. | 250/306 |
| 5,041,783 | 8/1991 | Ohta et al. | 250/306 |
| 5,083,022 | 1/1992 | Miyamoto et al. | 250/306 |

FOREIGN PATENT DOCUMENTS

| | | |
|---|---|---|
| 0027517 | 4/1981 | European Pat. Off. . |
| 0331148 | 9/1989 | European Pat. Off. . |
| WO89/01603 | 2/1989 | PCT Int'l Appl. . |

OTHER PUBLICATIONS

Review of Scientific Instruments, vol. 59, No. 7, Jul. 1988 pp. 1035-1038, American Institute of Physics, Compact, High-Stability, "Thimble-Size" Scanning Tunneling Microscope.
IBM Technical Disclosure Bulletin, vol. 31, No. 9, Feb. 1989, p. 216, Tip Revolver for Scanning Tunneling Microscope.
Journal of Vacuum Science & Technology, Part A, vol. 6, No. 2, Mar./Apr. 1988, American Vacuum Society, New York, Design of Scanning Tunneling Microscope for Biological Applications.
Rev. Sci. Instrum. 57 (3), Mar. 1986, pp. 441-445.

Primary Examiner—Bruce C. Anderson
Attorney, Agent, or Firm—Frishauf, Holtz, Goodman & Woodward

[57] ABSTRACT

A scanning tunneling microscope has an STM unit including a probe for scanning the surface of an object. The STM unit has at its outer peripheral surface a cylindrical enclosing member extending towards an object table. When the object is observed, the object table is elevated or the STM unit is lowered, so that the enclosing member is urged upon the table. The table and the STM unit constitute one body. As a result, relative movement between the object and the probe can be prevented, and also influence due to vibration can be prevented. In addition, the enclosing member isolates the object and the probe from the outside space, whereby electric noise, magnetic noise, sound noise and air flow are shielded. Thus, the influence due to external vibration can be reduced, and the stability is enhanced.

11 Claims, 7 Drawing Sheets

SCANNING TUNNELING MICROSCOPE

This application is a continuation of application Ser. No. 07/590,462, filed Sep. 28, 1990 abandoned.

BACKGROUND OF THE INVENTION

1. Field of the Invention

The present invention relates generally to a scanning tunneling microscope (STM) and more particularly to a scanning tunneling microscope including an optical system for optically observing an object.

2. Description of the Related Art

A scanning tunneling microscope (STM) was proposed by Binnig et al. in 1982 in U.S. Pat. No. 4,343,993. A sharply pointed probe is approached to the surface of an object, and a bias voltage is applied across the probe and the object. Consequently, a tunnel current flows between the probe and the object. It is known that the distance between the probe and the object varies by about one Angstrom, and that the tunnel current varies by about one order of magnitude. The STM utilizes the property of the tunnel current, thereby measuring the surface configuration of the object in an atomic level. For example, the probe is caused to scan the surface of the object, while the distance between the object and the probe is controlled to keep the value of the tunnel current constant. The position of the probe is recorded to obtain an image reflecting the surface configuration of the object in an Angstrom level.

The resolution of the STM is very high. Thus, the STM is not suitable for observation of a broad area on an object with low magnifying power, for selecting an observation region. Under the situation, there has been proposed an STM in which an optical microscope is built (hereinafter, called "optical microscope-built-in STM"). This type of STM includes an observation optical system capable of optically observing the surface of the object.

In the optical microscope-built-in STM, a conventional optical microscope is generally employed. For example, such an optical microscope has a revolver with a plurality of objective lenses. The objective lens is replaced by rotating the revolver. According to an optical microscope-built-in STM, STM units (each including a probe and a probe scan mechanism), in place of the objective lenses, are attached to the revolver.

In this type of optical microscope-built-in STM, an elevation stage for mounting an object table thereon and an STM unit are supported by a microscope body only at one side. Thus, the STM is easily affected by external vibration, and there is a relative displacement (a phase difference of vibration) between the probe and the object. In addition, space is present between the probe and the object, the STM is affected by air flow, external electric noise, and magnetic noise.

SUMMARY OF THE INVENTION

The object of the present invention is to provide a scanning tunneling microscope which is not easily affected by external noise and external vibration.

To this end, a scanning tunneling microscope of the invention comprises an STM unit having a probe for detecting a tunnel current, movement means for supporting and moving the probe along the surface of the object, and an enclosing member disposed around the probe and the movement means; hold means for holding the STM unit such that the axis of the probe intersects the surface of the object at right angles; a object table for mounting the object thereon; and means for moving at lease one of the STM unit and the table so that the enclosing member contacts the table to provide a closed space surrounding the object and the probe.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 1:
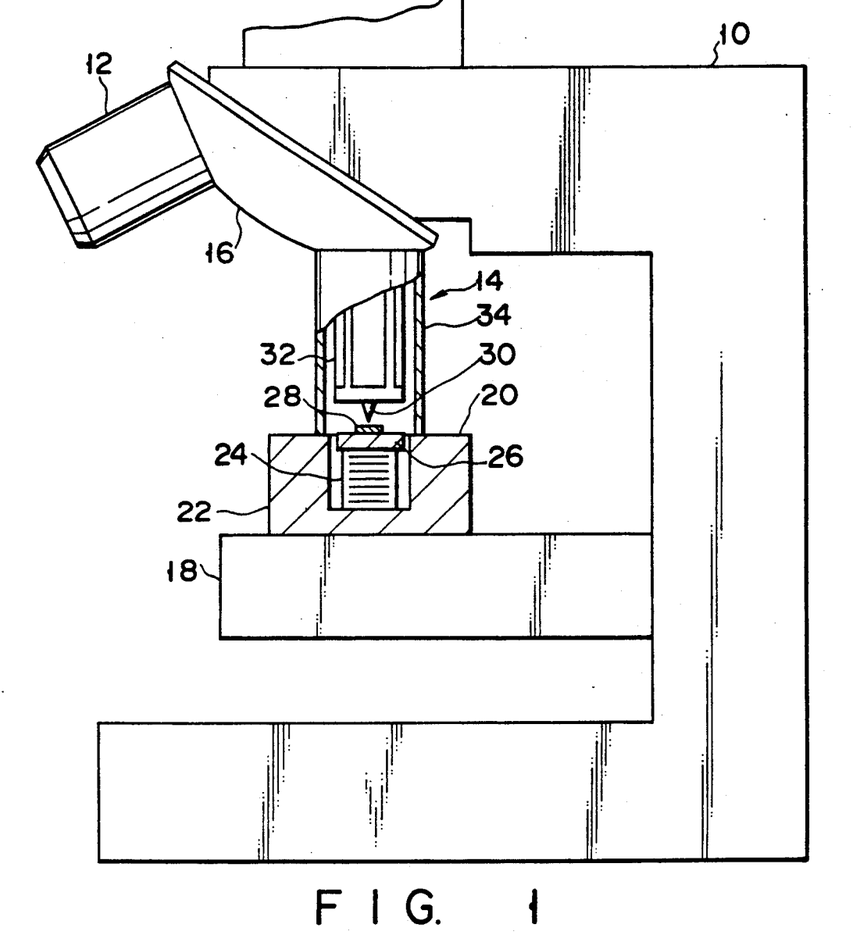
FIG. 1 shows the structure of a scanning tunneling microscope according to a first embodiment of the present invention.

A scanning tunneling microscope according to a first embodiment of the present invention will now be described with reference to FIG. 1. A microscope body 10 comprises a revolver 16 holding an objective lens 12 and an STM unit 14, and a vertically movable elevation stage 18. An object table 20 is mounted on the elevation stage 18. The object table 20 comprises a base member 22 having a cylindrical recess in its upper flat surface, a lamination type piezoelectric actuator 24 contained in the recess, and an object stage 26 mounted on the actuator 24. An object 28 is placed on the object stage 26. In the STM measurement mode, the object 28 is roughly moved in the vertical direction by the actuator 24. The STM unit 14 includes a probe 30 for detecting a tunnel current, and a cylindrical three-dimensional piezoelectric actuator 32. The probe 30 is attached to the bottom of the actuator 32. The actuator 32 has a common electrode in its inner part, and a four-division electrode on its outer peripheral surface. The voltage applied to these electrodes is controlled, and the probe 30 is scanned in three-dimensional directions. The STM unit 14 further includes a cylindrical enclosing member 34 surrounding the cylindrical piezoelectric actuator 32. The enclosing member 34 has a bottom surface which can be put in contact with that upper surface area of the base member 22, which is in the vicinity of the recess.

When the object 28 is optically observed, the revolver 16 is rotated to situate the objective lens 12 above the object 28. In this state, the elevation stage is moved vertically for focus adjustment. Thus, the surface of the object is optically observed.

When the object 28 is observed by the STM, the revolver 16 is rotated to situate the STM unit 14 above the object 28. The elevation stage 18 is raised to bring the enclosing member 34 into contact with the object table 20, such that the probe 30 and the object 28 are contained in the space defined by support member 34 and object table 20. It is desirable that the space defined by these be air-tight. Thus, the STM unit 14 and the object table 20 constitute one body. Then, the object 28 is approached to the probe 30 at such a distance that a tunnel current begins to flow, by means of a rough movement mechanism constituted by the lamination type piezoelectric actuator 24. A bias voltage is applied across the probe 30 and the object 28, thereby generating a tunnel current. While the voltage applied by the cylindrical three-dimensional piezoelectric actuator 32 is controlled so as to keep the tunnel current constant, the probe 30 is enabled to scan the surface of the object. Thus, an STM image of the object 28 is obtained.

According to the first embodiment, the STM unit 14 and the object table 20 are integrated in the STM observation mode. Thus, relative movement of the probe 30 and the object 28 can be prevented. In addition, since external electric noise, magnetic noise, sound noise, and air flow can be shielded by the enclosing member 34, stable STM observation can be carried out. Of course, the replacement of the sample 28 and probe 30 and the optical observation of the object 28 can be easily performed, as in a conventional optical microscope-built-in STM.

Figure 2:
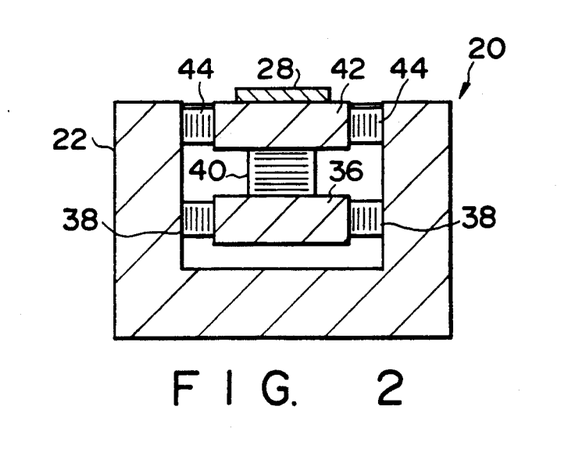
FIG. 2 shows the structure of another example of an object table used in the first embodiment.

In the first embodiment, the lamination type piezoelectric actuator 24 serving as a rough movement mechanism is disposed in the object table 20; however, an object table having another type of rough movement mechanism may be used. For example, as is shown in FIG. 2, an object table 20 having a rough movement mechanism called "inchwork mechanism". A base member 22 of the object table 20 has a recess. A lower slider 36 is supported in the recess by means of a lower support piezoelectric actuator 38 which pushes the inner wall of the recess. A movement piezoelectric actuator 40 is fixed on the upper surface of the lower slider 36. An upper slider (object stage) 42 is secured to the upper surface of the movement piezoelectric actuator 40. An upper support piezoelectric actuator 44 is provided on the side face of the upper slider 42. The actuator 44 pushes the inner wall of the recess and thereby supports the upper slider 42. The object 28 is placed on the upper slider 42. The object 28 is moved vertically by alternately releasing the fixation of the upper and lower support piezoelectric actuators 38 and 44 and by intermittently extending and retracting the movement piezoelectric actuator 40.

Figure 3:
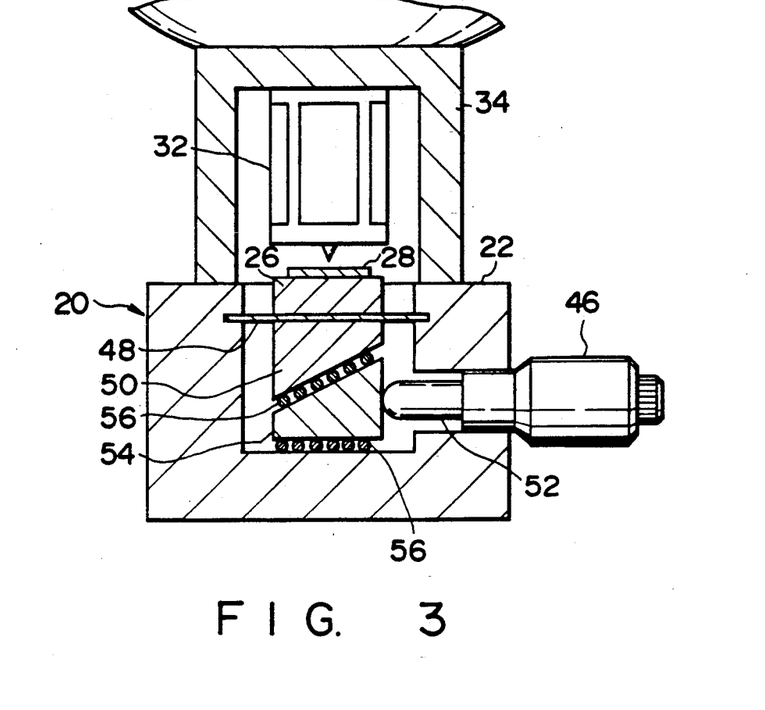
FIG. 3 shows the structure of still another example of the object table used in the first embodiment.

Alternatively, as is shown in FIG. 3, an object table 20 having a micrometer 46 as a rough movement mechanism may be used. A plate spring 48 is provided in the recess in the base member 22 of the object table 20. The plate spring 48 is fixed at both ends to the object table 20. An object stage 26 for supporting the object 28 is mounted on the upper surface of the plate spring 48. A vertically movable wedge-shaped upper slider 50 is provided on the lower surface of the plate spring 48. The micrometer 46 is mounted at a side surface of the base member 22. A tip of a working shaft 54 of the micrometer 46 abuts upon a horizontally movable wedge-shaped lower slider 54. Needle bearings 56 are provided on the upper and lower surfaces of the lower slider 54. The bearings 56 facilitate the movement of the lower slider 54. When the micrometer 46 is operated, the lower slider 54 moves horizontally. In accordance with the movement of the lower slider 54, the upper slider 50 moves vertically. Thus, the object 28 is moved vertically.

Figure 4:
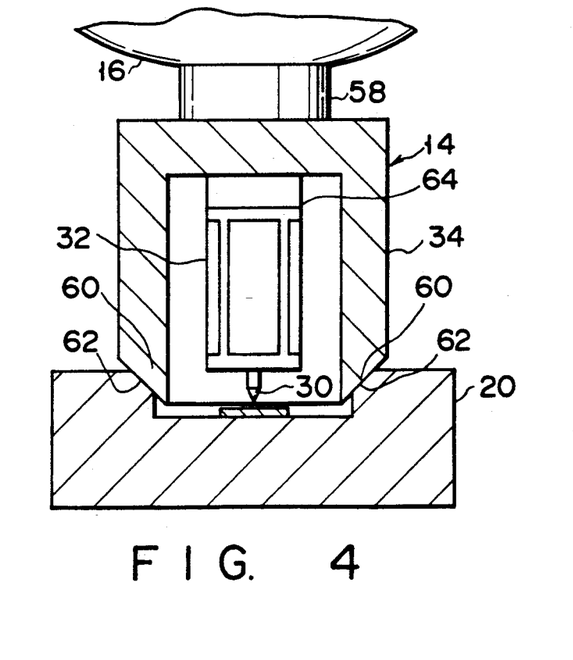
FIG. 4 shows the structure of a scanning tunneling microscope according to a second embodiment of the invention.

A second embodiment of the invention will now be described with reference to FIG. 4. In the second embodiment, an STM unit 14 is attached to a revolver 16 with an elastic member 58 (e.g. rubber) interposed. An enclosing member 34 of the STM unit 14 has a tapered portion. An edge portion of a recess in an object table 20, in which an object 28 is situated, is tapered s as to correspond to the tapered portion of the enclosing member 34. A cylindrical three-dimensional piezoelectric actuator 32 having a probe 30 is fixed in the cylinder of the enclosing member 34 via a lamination type piezoelectric actuator 64. The lamination type piezoelectric actuator 64 serves as a rough movement mechanism for vertically moving the probe 30.

In the second embodiment, if the elevation stage 18 supporting the object 20 is raised, as in the first embodiment, the enclosing member 34 (STM unit 14) and the object table 20 can be engaged at their tapered portions more firmly, than the case where only the elastic member 58 is interposed between the revolver 16 and the STM unit 14.

According to the second embodiment of the invention, since the elastic member 58 is interposed between the STM unit 14 and the revolver 16, the adjustment of the force for pressing the enclosing member 34 upon the object table 20 is not needed or facilitated. In addition, the positioning between the enclosing member 34 and the object table 20 can be made easier by virtue of the mating tapered portions formed at the lower end of the enclosing member 34 and at the object table 20.

Figure 5:
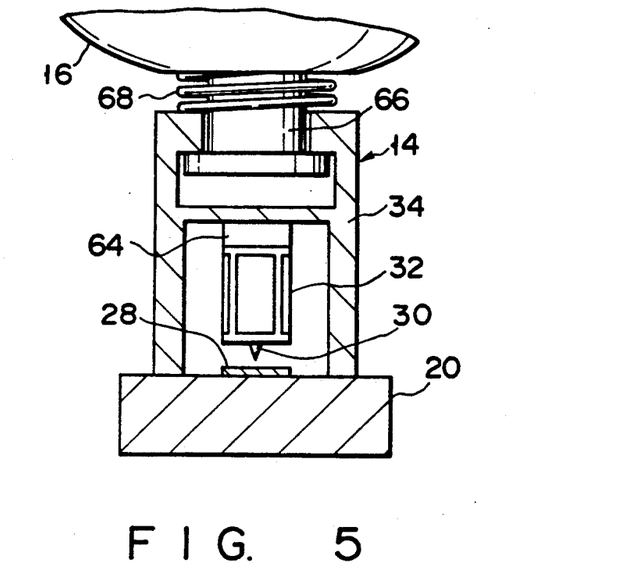
FIG. 5 illustrates a third embodiment of the invention.

FIG. 5 shows a third embodiment of the invention. In this embodiment, an STM unit 14 has a fixing member 66 which is vertically movable relative to an enclosing member 34. The fixing member 66 is coupled to a revolver 16, for example, by means of screwing. A coil spring 68 surrounds the fixing member 66, thereby providing an elastic force between the enclosing member 34 and the revolver 16. Like in the second embodiment, a cylindrical piezoelectric actuator 32 for enabling a probe 30 to scan is fixed in the cylinder of the enclosing member 34 via a lamination type piezoelectric actuator 64. According to the third embodiment, the same advantage as in the second embodiment can be attained by virtue of the coil spring 68. That is, the adjustment of the force for pressing the enclosing member 34 upon the object table 20 is not needed or facilitated.

Figure 6:
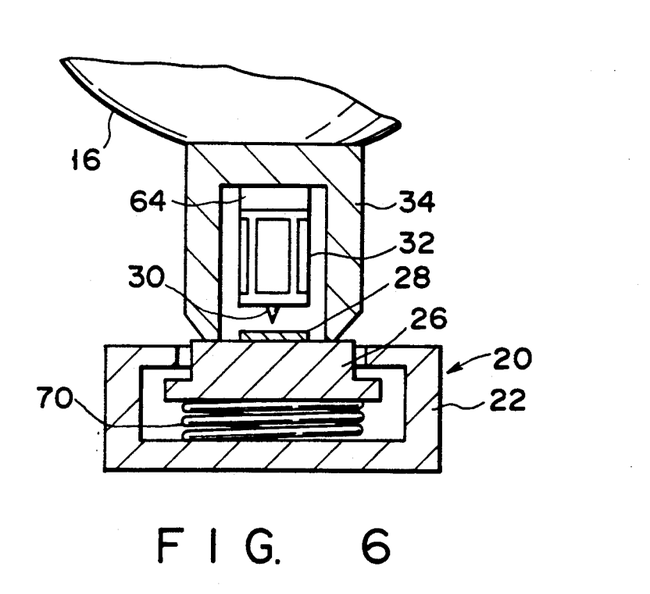
FIG. 6 shows the structure of a fourth embodiment of the invention.

A fourth embodiment of the invention will now be described with reference to FIG. 6. A cylindrical piezoelectric actuator 32 having a probe 30 is fixed in the cylinder of an enclosing member 34 via a lamination type piezoelectric actuator 64 for rough movement. An object table 20 comprises an object stage 26 for mounting an object 28 thereon, a base member 22 and a coil spring 70 interposed between the object stage 26 and the base member 22. The coil spring 70 makes it unnecessary to adjust the pressing force when the enclosing member 34 is pressed on the object stage 26.

Figure 7:
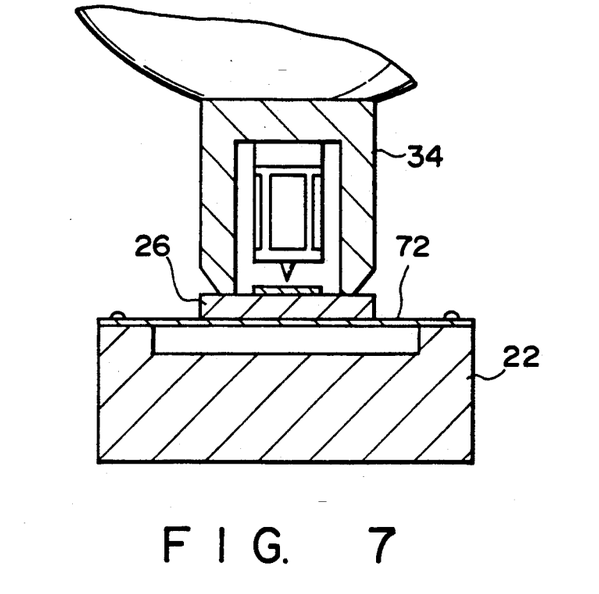
FIG. 7 shows the structure of another example of an object table used in the fourth embodiment.

FIG. 7 shows an object table in which the coil spring 70 is replaced with a plate spring 72. The object table 20 has the plate spring 72 fixed and passed over a recess in the base member 22. The object stage 26 is provided on the plate spring 72. With this structure, like the coil spring 70, the plate spring 72 makes it unnecessary to adjust the pressing force when the enclosing member 34 is pressed on the object stage 26.

Figure 8:
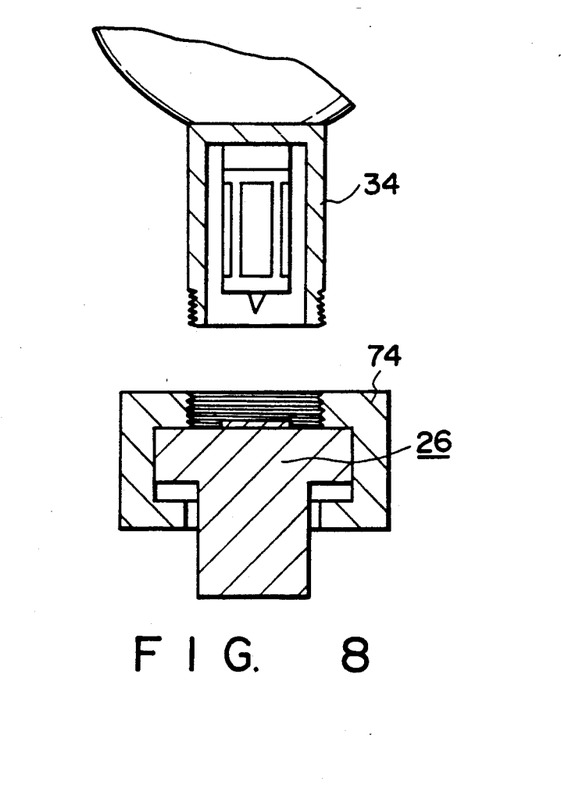
FIG. 8 shows the structure of a fifth embodiment of the invention.

A fifth embodiment of the invention will now be described with reference to FIG. 8. A screw portion is provided at a lower end of an enclosing member 34. The object table includes a fixing member 74 rotatable around an object stage 26. The fixing member 74 has an opening. The side face of the opening is provided with a screw portion mating with the screw portion of the threaded support portion of the enclosing member 34. This structure is combined with the above embodiments. The STM unit and the object table are firmly coupled as one body, by means of screwing. Thus, the relative displacement of the probe and the object can be prevented.

Figure 9:
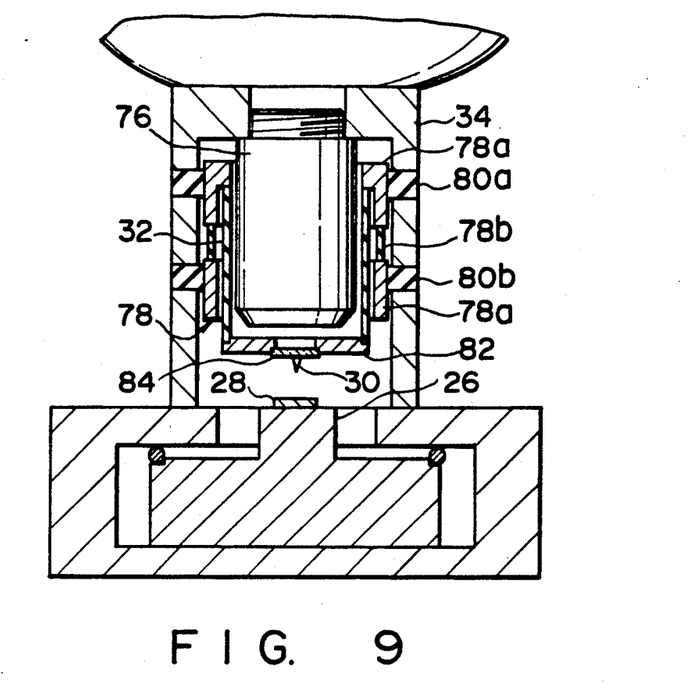
FIG. 9 shows the structure of a sixth embodiment of the invention.

FIG. 9 shows a sixth embodiment in which the present invention is applied to an optical microscope built-in type scanning tunneling microscope (PCT/JP88/00804) capable of carrying out optical observation and STM observation simultaneously. An STM unit 14 includes a cylindrical enclosing member 34 having a lower end opened. The enclosing member 34 has a screw hole in a center area of the inner surface of its upper wall. An objective lens 76 is engaged in the screw hole. A cylindrical frame 78 is provided between the outer peripheral surface of the objective lens 76 and the inner peripheral surface of the enclosing member 34. The frame 78 includes a pair of support members 78a located with a predetermined distance in the vertical direction, and a vertically extendible piezoelectric element 78b disposed between the support members 78a. The support member 78a are fixed by means of upper support fixing piezoelectric elements 80a and lower support fixing piezoelectric elements 80b formed in the peripheral wall of the enclosing member 34 such that the piezoelectric elements 80a and 80b are separated vertically. Each pair of piezoelectric elements 80 are separated 180°, from one another. An upper end of a cylindrical three-dimensional piezoelectric actuator 32, arranged coaxially with the objective lens 76 within the space defined by the frame 78 and the objective lens 76, is fixed to the upper support member 78a. The cylindrical piezoelectric actuator 32 releases alternately the fixation by the upper support fixing piezoelectric elements 80a and the fixation by the lower support fixing piezoelectric elements 80b. In accordance with the relaxing of the fixation, the piezoelectric element 78b is intermittently extended and contracted and is vertically moved by a so-called "inchworm mechanism". A peripheral portion of a circular metal frame 82 having a circular opening at its center area is fixed to a lower end portion of the actuator 32. It is desirable that the metal frame 82 is fixed by means of a screw or the like, in order to facilitate the replacement of the metal frame 82. The metal frame 82 is provided with a probe holder 84 closing the circular opening and made of a cover glass. A probe 30 is disposed on a center area of the probe holder 84.

Figure 10:
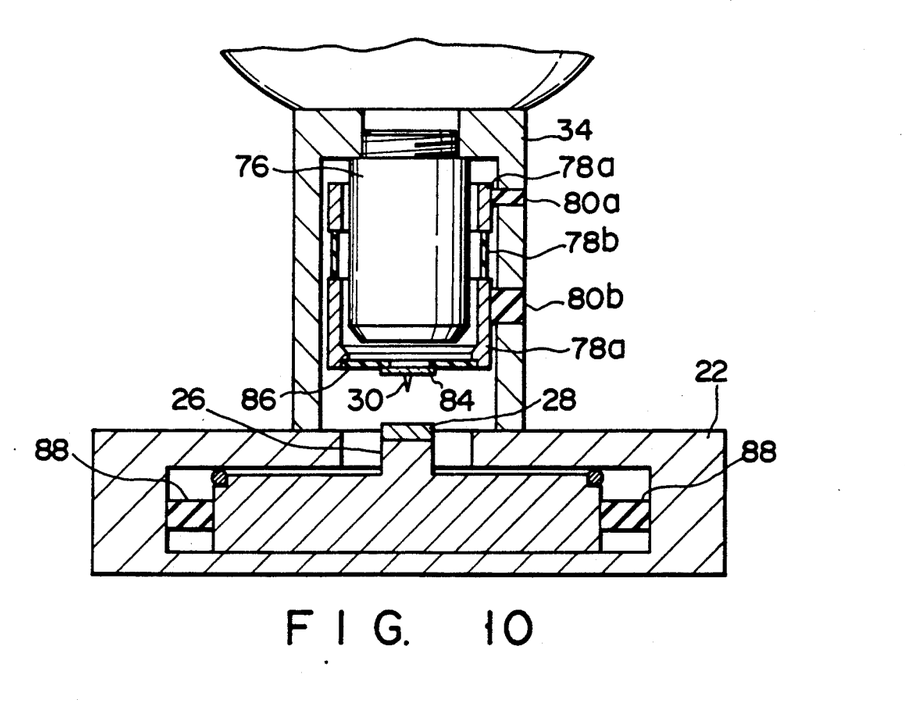
FIG. 10 shows the structure of a seventh embodiment of the invention.

FIG. 10 shows a seventh embodiment of the present invention, in which the present invention is applied to another type of optical microscope built-in scanning tunneling microscope. In an STM unit, the cylindrical three-dimensional piezoelectric actuator is replaced with a vertically movable disc-like bimorph piezoelectric element 86 having a circular opening at its center area. The peripheral portion of the bimorph piezoelectric element 86 is fixed by a lower support member 78a. The circular opening is closed by a probe holder 84 having a probe 30 and made of a cover glass. An object table 20 comprises a base member 22 and an object stage 26 contained in the base member 22. Piezoelectric elements 88 for moving the object stage 26 in the XY-plane are disposed between the base member 22 and the object stage 26. In the STM measurement mode, the probe 30 is raised by the bimorph piezoelectric element 86, and the object 28 is moved in the XY-plane by means of the piezoelectric elements 88.

Figure 13:
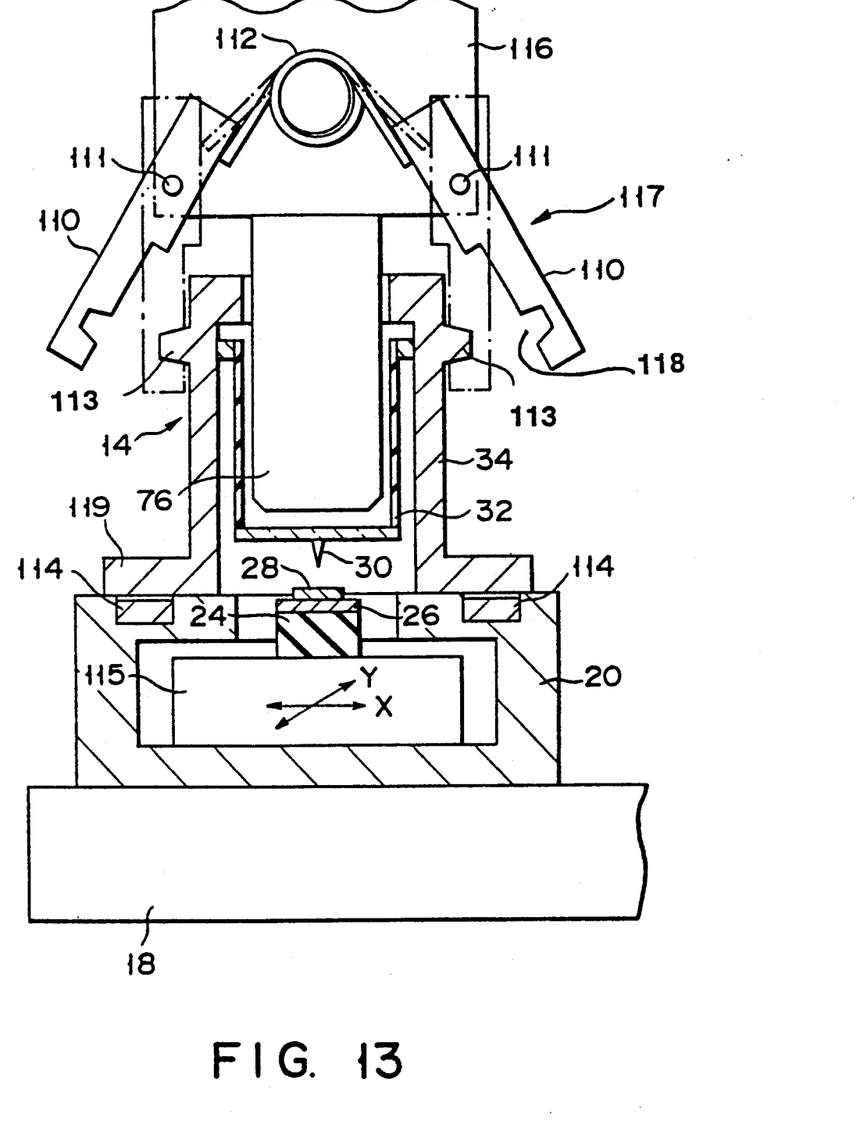
FIG. 13 shows an eighth embodiment of the invention.

FIG. 13 shows an eighth embodiment of the invention, in which the present invention is applied to another type of optical microscope built-in scanning tunneling microscope.

When an enclosing member 34 is not coupled to an object table 20, an STM unit 14 is held by a hold unit 117. The hold unit 117 is provided on a base 116 of an optical microscope having an objective lens 76. The hold unit 117 includes hook levers 110 which are rotatable about rotational shafts 111. Each hook lever 110 is provided with a hook groove 118 at one end, and is urged by a spring 112 at the other end. The hook groove 118 is engaged with a hook 113 provided on the side surface of the enclosing member 34.

In FIG. 13, the stage in which the STM unit 14 is held by the microscope base 116 is indicated by broken lines.

The enclosing member 34 has a fringe 119 made of iron. The fringe 119 can be put in contact with the object table 20. Magnetic elements 114 are embedded in the upper surface of the object table 20 so as to face the fringe 119. The measurement position of an object 28 on an object stage 26, which is situated within the object table 20, can be changed by an XY-movement unit 115 via a vertically movable rough movement lamination actuator 24 for vertically moving the object stage 26.

According to the eighth embodiment, when the elevation stage 18 is raised to bring the object table 20 into contact with the fringe 119, the magnetic elements 114 in the object table 20 attract and hold the fringe 119. At this time, the hook levers 110 are opened by a mechanism (not shown) and the hook grooves 118 are released from the hooks 113. Thus, the coupling between the STM unit 14 and the microscope body 116 is released.

In this eighth embodiment, unlike the second and third embodiments, the coupling by means of the elastic member is not employed, and only the STM unit and the object table are coupled.

According to these embodiments, like the above-described embodiments, electric noise, magnetic noise and sound noise is cut and air flow is also cut. Thus, a highly stable optical microscope built-in scanning tunneling microscope.

Figure 11:
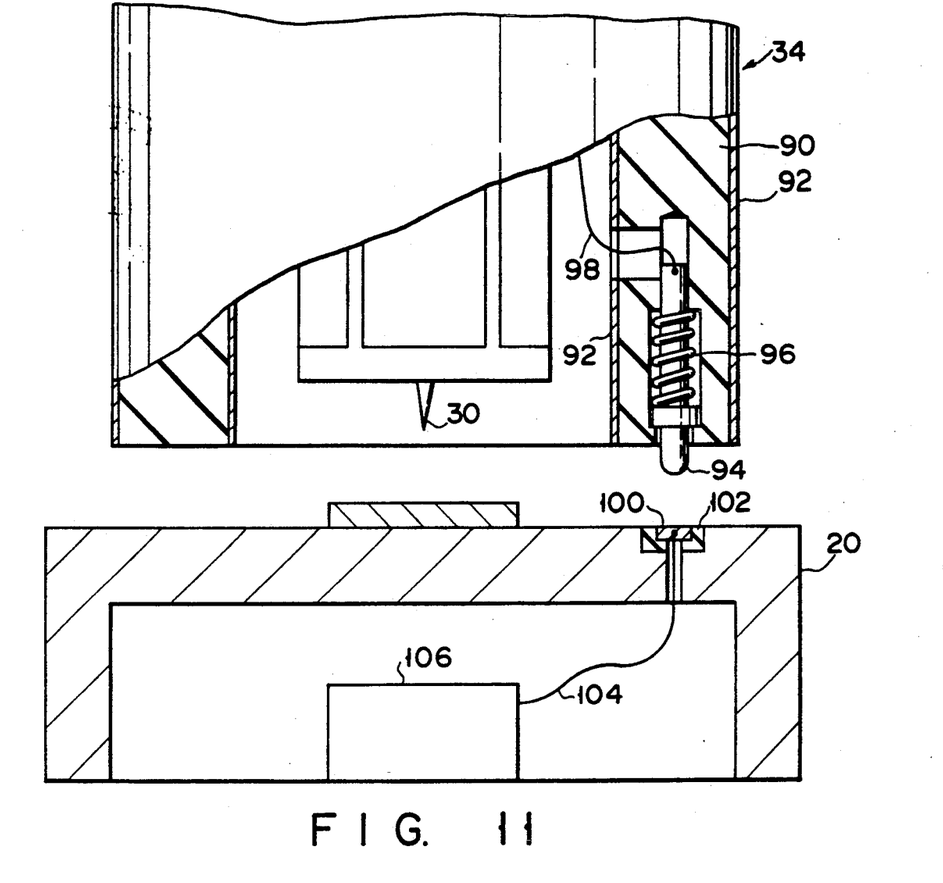
FIG. 11 shows the structure of a ninth embodiment of the invention.

Another embodiment embodiment of the present invention will now be described with reference to FIG.

11. In this embodiment, an enclosing member 34 is constituted by a cylindrical insulator 90 having electrically conductive films 92 on its inner and outer surfaces. The enclosing member 34 has an electrode pin 94 projecting from the lower end of the enclosing member 34. The electrode pin 94 is vertically movable within the insulator 90. A lower end portion of the electrode pin 94 is projected downwards by a coil spring 96. The electrode pin 96 is electrically connected to a probe 30 through a lead 98. An object table 20 has an electrode plate 100 disposed at an area which is put in contact with the electrode pin 96. An insulator 102 is interposed between the electrode plate 100 and the object table 20. The electrode plate 100 is connected to a preamplifier 106 through a lead 104. The preamplifier 106 is disposed within the object table 20. In the STM mode, a lower end portion of the enclosing member 34 is brought into contact with the object table 20. The pin 94 is put in contact with the electrode plate 100. Thus, the probe 30 is electrically connected to the preamplifier 106. According to this embodiment, a tunnel current can be led to the preamplifier, with the shortest distance. In addition, since the lead passes through an electrically shielded region, a small tunnel current susceptible to noise can be supplied to the preamplifier with no influence due to noise.

Figure 12:
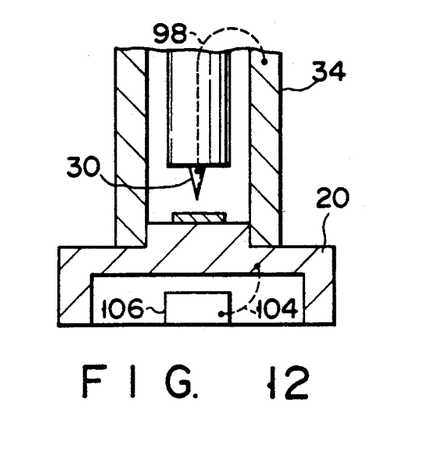
FIG. 12 shows a structure which may be substituted for the ninth embodiment of the invention.

Furthermore, as is shown in FIG. 12, the electrode pin 94 and the electrode plate 100 may be replaced with an electrically conductive enclosing member 34 and an electrically conductive object plate 20. The enclosing member 3 is put in contact with the object table 20, and the probe 30 is electrically connected to the preamplifier. Thus, similar advantages can be obtained.

Additional advantages and modifications will readily occur to those skilled in the art. Therefore, the invention in its broader aspects is not limited to the specific details, and representative devices, shown and described herein. Accordingly, various modifications may be without departing from the spirit or scope of the general inventive concept as defined by the appended claims and their equivalents.

What is claimed is:

1. A scanning tunneling microscope for investigating a surface of a sample, comprising:
    an STM unit including a probe for detecting a tunnel current, said probe having an axis, movement means for supporting and moving said probe along the surface of the sample, and an enclosing member disposed around said probe and said movement means;
    an optical system for preliminarily observing the surface of the sample for locating a portion of the sample which is to be subjected to STM measurement by said STM unit, said optical system including an objective lens having an optical axis;
    a table for mounting the sample thereon, said table having an axis passing through the sample;
    holding means for holding both said STM unit and said objective lens, said holding means including means for selectively brining the axis of said probe and the optical axis of said objective lens into substantial coincidence with the axis of said table one-at-a time; and
    means for moving at least one of said STM unit and said table relative to each other, only when said axis of said probe is brought into coincidence with the axis of said table, so that said table contacts with said enclosing member to provide a closed space surrounding the sample and said probe.

2. The microscope according to claim 1, wherein:
    said enclosing member comprises an electrically conductive cylindrical member having a tapered end portion; and
    said table has a portion which engages the tapered end portion of said enclosing member.

3. The microscope according to claim 1, wherein said holding means includes an elastic member, and said STM unit is supported via the elastic member.

4. The microscope according to claim 1, wherein said table has a stage portion supported by an elastic member, the sample is placed on said table, and an end portion of said enclosing member is brought into contact with said stage portion.

5. The microscope according to claim 1, wherein:
    said enclosing member having a threaded end portion; and
    said table includes a stage portion for mounting the sample thereon and a member having in an inner peripheral wall thereof a threaded portion which is engageable with said threaded end portion of said enclosing member.

6. The microscope according to claim 1, comprising a detection circuit for detecting a tunnel current, and wherein:
    said enclosing member has at an end portion thereof a first electrode electrically connected to said probe; and
    said table has a second electrode electrically connected to said detection circuit;
    said first and second electrodes being electrically connected to each other when said enclosing member is brought into contact with said table.

7. The microscope according to claim 1, wherein said holding means includes a rotatable revolver which is rotatable to direct one of said objective lens and said STM unit to the sample.

8. The microscope according to claim 1, further comprising means for magnetically fixing said enclosing member and said table to each other.

9. The microscope according to claim 8, wherein said STM unit further comprises means for releasing said enclosing member, with said enclosing member and said table being fixed to each other.

10. A method for operating a microscope apparatus which includes a scanning tunneling microscope (STM) and an optical microscope, the microscope apparatus further including a sample table on which a sample to be mounted and an STM unit for STM measurement enclosed by an enclosing member supported by a body portion of the optical microscope, said enclosing member being at the optical microscope side, said STM unit including an STM probe which is constantly located within a vision of field of the optical microscope, the method comprising the steps of:
    observing the sample by means of said optical microscope, for selecting a particular point of said sample to be measured by the scanning tunneling microscope;
    moving the STM probe to the particular point of said sample;
    causing said enclosing member and said sample table to contact with each other such that said enclosing member encloses a sample portion when the STM probe is brought close to the sample; and thereafter performing an STM measurement with said microscope apparatus.

11. A scanning tunneling microscope for investigating a surface of a sample, comprising:
- an STM unit including a probe for detecting a tunnel current, said probe having an axis, movement means for supporting and moving said probe along the surface of the sample, and an enclosing member disposed around said probe and said movement means;
- an optical system for preliminarily observing the surface of the sample for locating a portion of the sample which is to be subjected to STM measurement by said STM unit, said optical system including an objective lens having an optical axis,
- a table for mounting the sample thereon, said table having an axis passing through the sample;
- holding means for holding both said STM unit and said objective lens, said holding means including means for bringing the axis of said probe and the optical axis of said objective lens into substantial coincidence with the axis of said table; and
- means for moving at least one of said STM unit and said table relative to each other, only when said axis of said probe is brought into coincidence with the axis of said table, so that said table contacts with said enclosing member to provide a closed space surrounding the sample and said probe, said movement means including a cylindrical piezoelectric actuator and an optically transparent member provided at an end portion of said cylindrical piezoelectric actuator, and said objective lens being disposed within said cylindrical piezoelectric actuator.

* * * * *